United States Patent
Hayes

(10) Patent No.: US 8,423,615 B1
(45) Date of Patent: Apr. 16, 2013

(54) SYSTEM AND METHOD FOR RESTRICTING DISTRIBUTION OF ELECTRONIC MESSAGES

(75) Inventor: Barry Hayes, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 1394 days.

(21) Appl. No.: 11/567,683

(22) Filed: Dec. 6, 2006

(51) Int. Cl.
*G06F 15/16* (2006.01)
*G06F 7/04* (2006.01)
*G06F 3/048* (2006.01)

(52) U.S. Cl.
USPC .............................. 709/206; 726/27; 715/822

(58) Field of Classification Search ................. 709/206; 726/26–33; 715/822
See application file for complete search history.

(56) References Cited

U.S. PATENT DOCUMENTS

| | | | |
|---|---|---|---|
| 6,115,709 A * | 9/2000 | Gilmour et al. | |
| 6,138,146 A * | 10/2000 | Moon et al. | 709/206 |
| 6,591,367 B1 * | 7/2003 | Kobata et al. | 726/31 |
| 7,529,940 B1 * | 5/2009 | Winkel et al. | 713/170 |
| 7,590,693 B1 * | 9/2009 | Chan et al. | 709/206 |
| 7,783,711 B2 * | 8/2010 | LeVasseur et al. | 709/206 |
| 2002/0129111 A1 * | 9/2002 | Cooper | 709/207 |
| 2003/0233410 A1 * | 12/2003 | Gusler et al. | 709/206 |
| 2004/0049696 A1 * | 3/2004 | Baker et al. | 713/201 |
| 2004/0153512 A1 * | 8/2004 | Friend | 709/206 |
| 2004/0221012 A1 * | 11/2004 | Heumesser | 709/206 |
| 2005/0198099 A1 * | 9/2005 | Motsinger et al. | 709/200 |
| 2006/0212523 A1 * | 9/2006 | Daniels et al. | 709/206 |
| 2007/0038610 A1 * | 2/2007 | Omoigui | 707/3 |
| 2008/0086530 A1 * | 4/2008 | Gandhi et al. | 709/206 |

* cited by examiner

*Primary Examiner* — Gregory Todd
(74) *Attorney, Agent, or Firm* — Morgan, Lewis & Bockius LLP

(57) ABSTRACT

A method of restricting distribution of electronic messages may include receiving an electronic message, enabling a recipient of the electronic message to compose a related message that includes at least a portion of the message content, and notifying the recipient if the list of proposed recipients is inconsistent with the distribution restriction information embedded in the received electronic message. The message may include message content and embedded distribution restriction information and the composed message may include a list of proposed recipients.

24 Claims, 10 Drawing Sheets

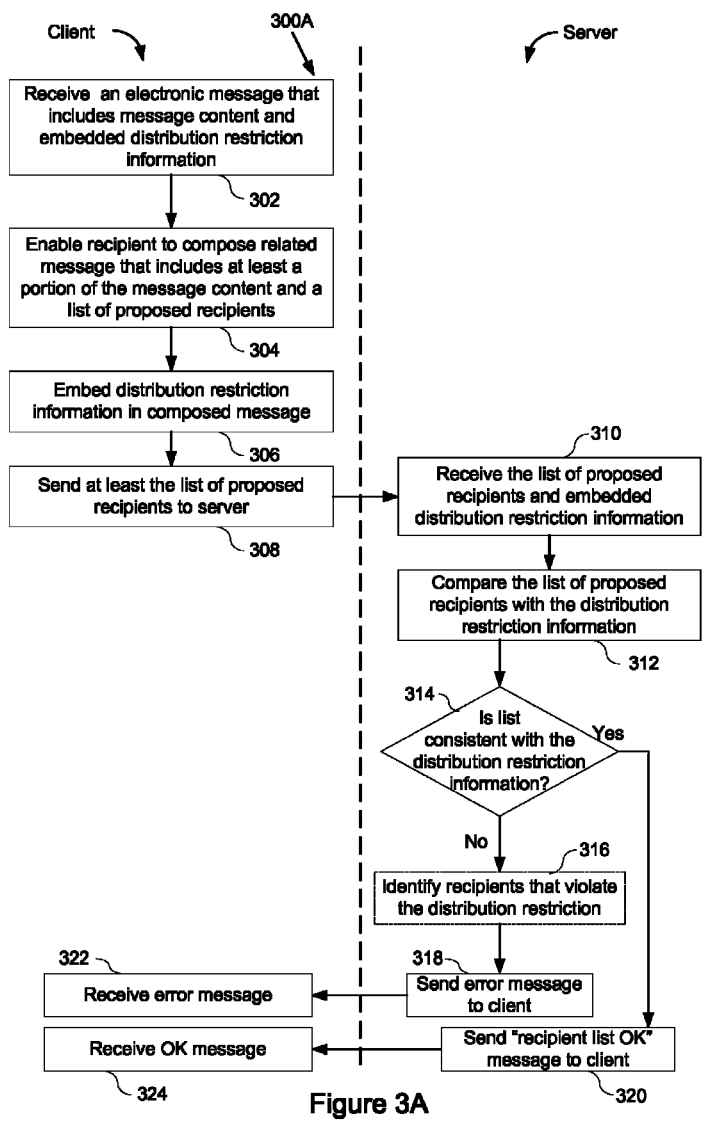

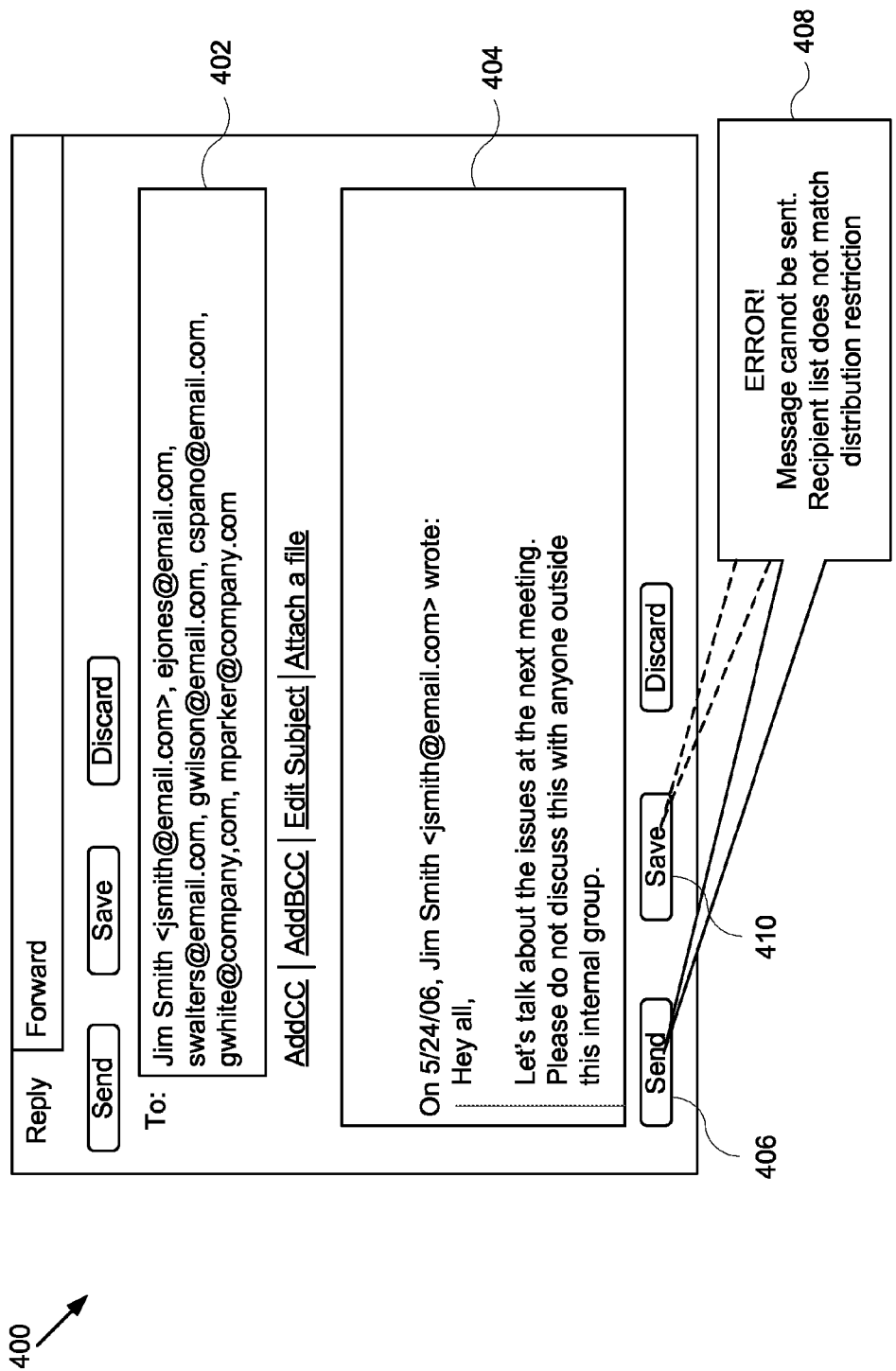

SYSTEM AND METHOD FOR RESTRICTING DISTRIBUTION OF ELECTRONIC MESSAGES

TECHNICAL FIELD

The disclosed embodiments relate generally to messaging systems. In particular, this invention relates to email message systems and methods for placing limitations or restrictions on the distribution of email messages.

BACKGROUND

Exchanging electronic messages has increasingly become a popular form of communication. Many people exchange electronic messages (also known as email messages) for personal communication, as well as for business communication. Once an electronic message is composed and sent, a related message may be created from that original electronic message. Such related message may be a reply to the sender of the message or a reply to all the recipients of that original message. A related message may also be a forwarding of the original message to other individuals. The related message may also contain part of or the entire contents in the original message. Often, however, electronic communications exchanged between different people, or groups of people contain confidential information, which is usually not intended for any individuals outside a certain defined group. The delivery of such confidential information should be restricted or limited to those people authorized to possess the confidential information.

SUMMARY

A method of restricting distribution of electronic messages may include receiving an electronic message having message content and embedded distribution restriction information, enabling a recipient of the electronic message to compose a related message that includes at least a portion of the message content and a list of proposed recipients, and notifying the recipient if the list of proposed recipients is inconsistent with the distribution restriction information embedded in the received electronic message.

A method of restricting distribution of electronic messages may include receiving an electronic message having message content and embedded distribution restriction information, enabling a recipient of the electronic message to compose a related message that includes at least a portion of the message content and a list of proposed recipients, embedding the distribution restriction information in the composed message, sending at least the list of proposed recipients to a server, and receiving an error message from the server if the list of proposed recipients in the composed message is inconsistent with the distribution restriction information embedded in the received electronic message.

A method of restricting distribution of electronic messages may include receiving a list of proposed recipients of an electronic message and distribution restriction information associated with the electronic message, comparing the list of proposed recipients with the distribution restriction information associated with the electronic message; and sending an error message to the client if the list of proposed recipients in the electronic message is inconsistent with the distribution restriction information associated with the received electronic message.

A system for restricting distribution of electronic messages may include memory, one or more processors, and one or more modules stored in memory and configured for execution by the one or more processors. The modules may include instructions for receiving an electronic message having message content and embedded distribution restriction information; instructions for enabling a recipient of the electronic message to compose a related message that includes at least a portion of the message content, the composed message including a list of proposed recipients; and instructions for notifying the recipient if the list of proposed recipients is inconsistent with the distribution restriction information embedded in the received electronic message.

A computer program product used in conjunction with a computer system may include a computer readable storage medium and a computer program mechanism embedded therein. The computer program mechanism may include instructions for receiving an electronic message having message content and embedded distribution restriction information; instructions for enabling a recipient of the electronic message to compose a related message that includes at least a portion of the message content, the composed message including a list of proposed recipients; and instructions for notifying the recipient if the list of proposed recipients is inconsistent with the distribution restriction information embedded in the received electronic message.

A system for restricting distribution of electronic messages may include memory, one or more processors, and one or more modules stored in memory and configured for execution by the one or more processors. The modules may include instructions for receiving a list of proposed recipients of an electronic message and distribution restriction information associated with the electronic message; instructions for comparing the list of proposed recipients with the distribution restriction information associated with the electronic message; and instructions for sending an error message to the client if the list of proposed recipients in the electronic message is inconsistent with the distribution restriction information associated with the received electronic message.

A computer program product for use in conjunction with a computer system, the computer program product comprising a computer readable storage medium and a computer program mechanism embedded therein, the computer program mechanism may include instructions for receiving a list of proposed recipients of an electronic message and distribution restriction information associated with the electronic message; instructions for comparing the list of proposed recipients with the distribution restriction information associated with the electronic message; and instructions for sending an error message to the client if the list of proposed recipients in the electronic message is inconsistent with the distribution restriction information associated with the received electronic message.

BRIEF DESCRIPTION OF THE DRAWINGS

FIG. 3A is a flow diagram of a process for restricting distribution of electronic messages according to other embodiments of the present invention.

FIG. 4A illustrates a schematic screenshot of an electronic message with a distribution restriction warning according to some embodiments of the present invention.

Like reference numerals refer to corresponding parts throughout the drawings.

DETAILED DESCRIPTION OF THE INVENTION

Figure 1:
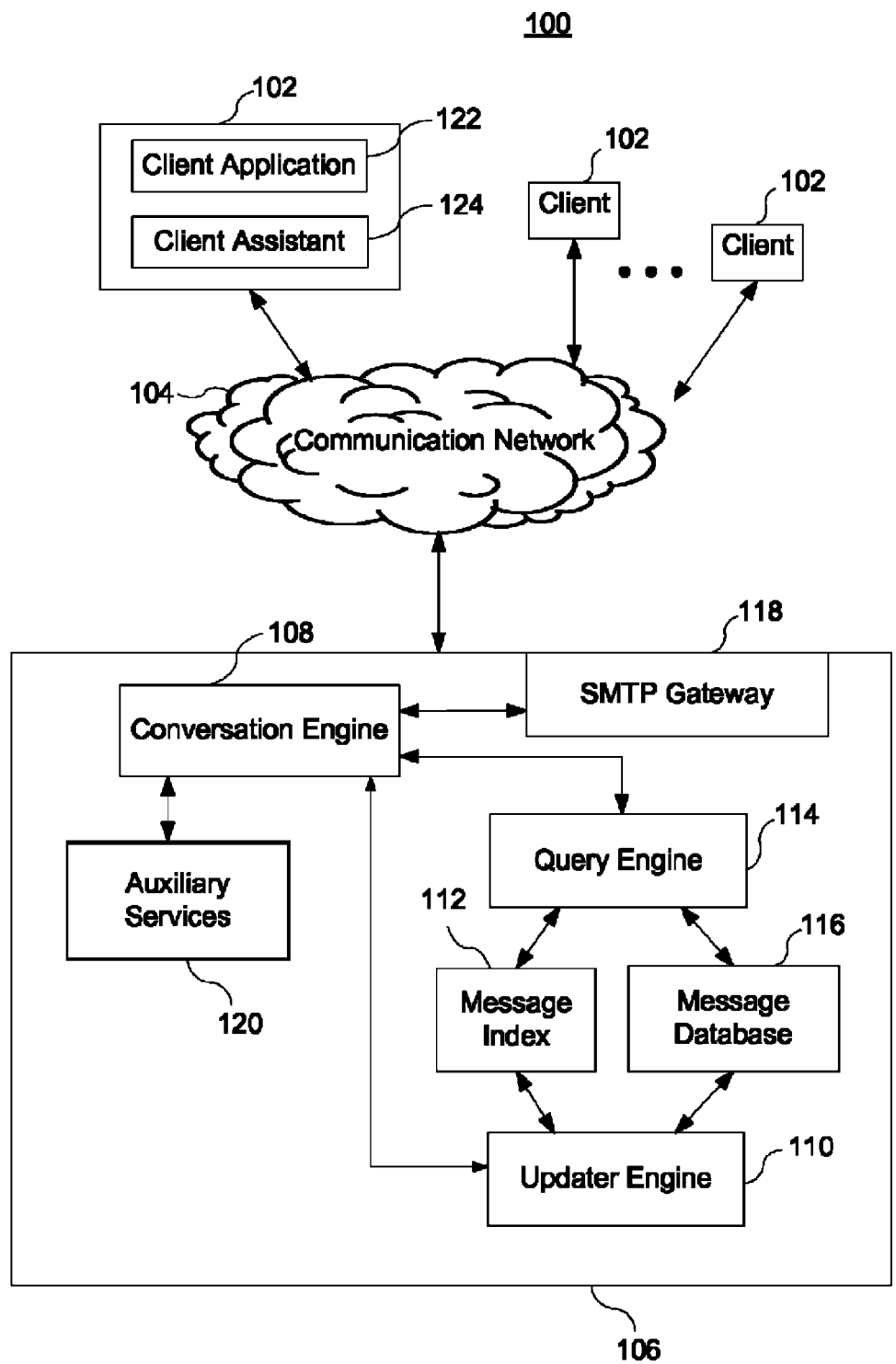
FIG. 1 is a block diagram of a system for implementing some embodiments of the present invention.

FIG. 1 is a block diagram of a system 100 for implementing some embodiments of the present invention. One or more client computers or devices 102 (hereinafter "clients") can be connected to a communication network 104. The communication network 104 may be connected to an information service 106. The information service 106 may include a conversation engine 108, an updater engine 110, a message index 112, a query engine 114, a message database 116, an SMTP gateway 118, and one or more auxiliary services 120. These components of information service 106 are exemplary, and thus other information services 106 that implement aspects of the invention may have other components and/or components that are differently organized.

The client 102 may be any one of a number of devices (e.g. a computer, an internet kiosk, a personal digital assistant, a cell phone, a desktop computer, or a laptop computer) and can include a client application 122 and a client assistant 124. The client application 122 may be a software application that permits a user to interact with the client 102 and/or network resources to perform one or more tasks. For example, the client application 124 may be a web browser (e.g., Firefox), an email client (e.g., Exchange client), or other type of application that permits a user to search for, browse, and/or use resources, such as one or more web pages, on the client 102 and/or accessible via the communication network 104.

The communication network 104 may be any local area network (LAN) and/or wide area network (WAN), such as an intranet, an extranet, or the Internet. It is sufficient that the communication network 104 provides communication capability between the clients 102 and the information service 106. In some embodiments, the communication network 104 uses the Transmission Control Protocol/Internet Protocol (TCP/IP) to transport information, and the clients 102 use the HyperText Transport Protocol (HTTP) to access various resources available via the communication network 104. The various embodiments of the invention, however, are not limited to the use of any particular protocol. The term "resource" as used throughout this specification refers to any piece of information or service that is accessible via a network location or address (e.g., a Uniform Resource Locator (URL)) and can be, for example, a web page, a text or work processing document, an email message, a transcribed voice message, a database, an image, or a computational object.

The conversation engine 108 can respond to a variety of requests (e.g., from the client assistant 124 of a client 102) related to electronic messages and return responses via its connection with the communication network 104. In some embodiments, the electronic messages are grouped into conversations by the conversation engine 108. A conversation may include one or more relevant messages relating to a conversation topic. Various criteria can be used to determine which messages belong to each distinct conversation. For example, an analysis can be made of the contents of message received and/or sent by a user. In another example, a thread identifier found in a message header can also be used to identify related messages. The senders and recipients of the messages are participants in the conversation. In some embodiments, a conversation may include a message draft that has been composed by a user, but not delivered to its recipient(s) by the information service 106. In the context of the present application, the term "message" refers to electronic messages received by the user and message drafts composed by the user. All messages directed to a user of the information service 106 can be grouped into a plurality of conversations and presented to the user in a conversation-based format, individually or jointly. In a conversation list view, a user can see in a summary form a list of conversations in which the user participates. In a conversation view, the user can see in an expanded form one or more of messages associated with a particular conversation.

In some embodiments, the information service 106 creates a snippet of a conversation or a message. A snippet provides a user with a preview of the contents of the conversation or message without the user having to open the conversation or the message. In a list of conversations, the snippet can be generated from the most recent messages in the conversation. The snippet can also be extracted from the first message (i.e., the oldest message) in the conversation. The snippet can also be extracted from all the messages in the conversation according to the predefined heuristic rules, e.g., listing a set of keywords appearing most frequently in the conversation. If the information service 106 is preparing a list of conversations in response to a search submitted by a user, the information service 106 can create a snippet for each conversation in the list, or for each conversation in a displayed portion of the list, the snippet can include a portion of the conversation that matches user-submitted query terms. These snippets may be similar in one or more respects to snippets includes in search results returned by a search engine, such as the Google search engine. In a conversation view, a snippet can be generated for one or more messages in the conversation.

The SMTP gateway 118 is also connected to the communication network 104. The SMTP gateway 118 assists in receiving and sending messages between the information service 106 and other email systems, messaging systems, information services or servers. In some embodiments, the SMTP gateway 118, for example, transmits and receives messages using the simple mail transfer protocol (SMTP). The SMTP gateway 118 can receive a new message from the communication network 104 and send the message to conversation engine 108 for additional processing. Additionally, the SMTP gateway 118 can received messages from the conversation engine 108 and then transmit (via the communication network 104) those messages to recipient addresses specified in the messages.

The updater engine 110 may perform various operations on the messages. For example, the updater engine 110 generates index entries for the message and stores the index entries in the message index 112. The message itself is stored in the message database 116.

When a user logs into his or her account from a client 102, the conversation engine 108 submits a request to the query engine 114 soliciting messages directed to the recipient. The query engine 114 accordingly queries the message index 112 and the message database 116 to relevant information. Next, the query engine 114 prepares a response using the collected information and transmits the response to the requesting client through the conversation engine 108 and/or the SMTP gateway 118.

One or more auxiliary services servers 120 can provide additional services to the conversation engine 108. The auxiliary services servers 120 can, for example, include a message distribution restriction module for restricting the transfer of messages to unauthorized recipients.

FIG. 1 is exemplary. In some embodiments, the information service 106 contains a subset or superset of those elements illustrated in the figure. Although FIG. 1 shows the information service 106 as a number of discrete elements, this figure is intended more as a functional description of the various features which may be present in the information service 106 than as a structural schematic of the various embodiments. In practice, and as recognized by those of ordinary skill in the art, some elements shown separately could be combined and come elements could be further divided into sub-elements or parallel elements. For example, some separate elements in FIG. 1 could be implemented by a single server or module and some single elements could be implemented by one or more servers or modules. The actual number of servers and how features are allocated among the servers will vary from one implementation to another, and may depend in part on the amount of traffic that the system must handle during peak usage periods as well as during average usage periods. For example, the message database 116 can be implemented using a plurality of servers if the information service 106 manages a large volume of messages associated with a large number of user accounts.

As mentioned above, the client 102 can include client application 122 and client assistant 124. Client application 122 can provide a window to be displayed on a displaying device (e.g., a monitor) for rendering conversations associated with a particular user. The conversations and their associated messages can be encoded using HyperText Markup Language (HTML), XML, or any other appropriate markup language or encoding scheme, and then rendered by the client application 122. When a user submits a request through client application 122 to the information service 106 to access messages stored in the user's account, the information service 106 identifies conversations in the user's account in accordance with the user's request and transfers them as well as a set of display instructions back to the client 102. Client assistant 124 can, in response, generate one or more forms in accordance with the display instructions, where each form can include information of one or more of the conversations. The forms can then be submitted to and rendered by the client application 122. In another embodiment, client assistant 124 may alternatively exist and operate in the information service 106.

The information service 106 and the client assistant 124 work in concert to allow a user to view, compose, send and/or search messages in the user's account and to present the search results in a highly intuitive fashion. The information service 106 extracts information from a user's account by processing messages received, sent and/or being composed by the user, and the client assistant 124 assists in rendering the information prepared by the information service 106. In other embodiments a different division of duties between the information service 106 and the client assistant 124 can be implemented. Because many of the tasks performed by the system can be performed by either the information service 106 or the client assistant 124 or by the two working together, these two components are sometimes herein referred to jointly as the "conversation system".

The conversation system can provide at least two different views, including a conversation list view and a conversation view as mentioned briefly above. In a conversation list view, a plurality of conversations can be displayed where each conversation can be displayed in a summary form. For example, each conversation can be represented by a number of conversation elements. The conversation elements can include one or more of: a number indicating the number of messages in the conversation, a list of one or more of textual identifiers or names of the participants of the conversation, a conversation description (e.g., a subject line of the message), a date/time value of the conversation (e.g., a date/time value of the last received message in the conversation), and a snippet from one or more of the messages in the conversation. A participant of the conversation may have an associated graphical user identifier. In some embodiments, the client application 122 displays the graphical user identifier in a small pop-up window when a user moves his or her mouse cursor over the participant's name. In some other embodiments, the graphical user identifier is displayed next to the participant's name in the conversation list view. In one approach, each conversation can be represented as a single row in the conversation list view.

In a conversation view, one or more messages from a conversation can be displayed. Each message can be displayed in one of a number of various modes, for example an expanded mode, a compacted mode, or a compressed mode. In an expanded mode, the body of the message can be displayed along with, for example, header information including names or other identifiers of the sender and the recipients of the message, a date/time value indicative of when the message is received or sent, routing information, and other properties of the message. In some embodiments, the client application 122 pops up a small window displaying a graphical user identifier associated with any sender or recipient when a user moves his or her mouse cursor over the name of the sender or recipient. An expanded mode can be used, for example, for messages which are marked as "unread." In a compacted mode, the message body can be hidden and a snippet from the message is provided in its place. The snippet can be chosen to occupy less space than the body. For example, a snippet can be chosen to occupy only one line in a display window. The compacted mode can be used for messages which have been read or marked as read. The compacted mode allows messages in a conversation to be displayed within the same window more densely than if the expanded mode were used. In a compressed mode, a message can be represented with a small bar. The small bar can contain no message information. The visual effect of such a mode can be that multiple compressed messages appear like the edges of cards in a deck of cards. A user can toggle between the various display modes by selecting a message or using various controls in the display window. It should be understood that the techniques described in this specification with reference to a conversation (as might be found in the Google Gmail product) can be equally used with any message system (e.g., Outlook or Thunderbird) where messages can be displayed in various views (and can include portions of messages) such as a message view or a thread view where related messages can be displayed.

In some embodiments, when a conversation is being displayed in the conversation view, additional, targeted information can be displayed in the display window. For example, one or more advertisements relevant to, or related to, one or more of the messages in the conversation can be displayed. In another example, one or more other types of information can be displayed. Such other information can include, but is not limited to news items or links to news items, map links, phone numbers, links to product information, stock prices or links to stock prices, links to weather forecasts, web page links, dictionary entries or links to dictionary entries, images or links to images, RSS feeds or links to RSS feeds, links to blog (web log) events, links to user polls, links to files or other content on the client 102, and other types of information.

Figure 2A:
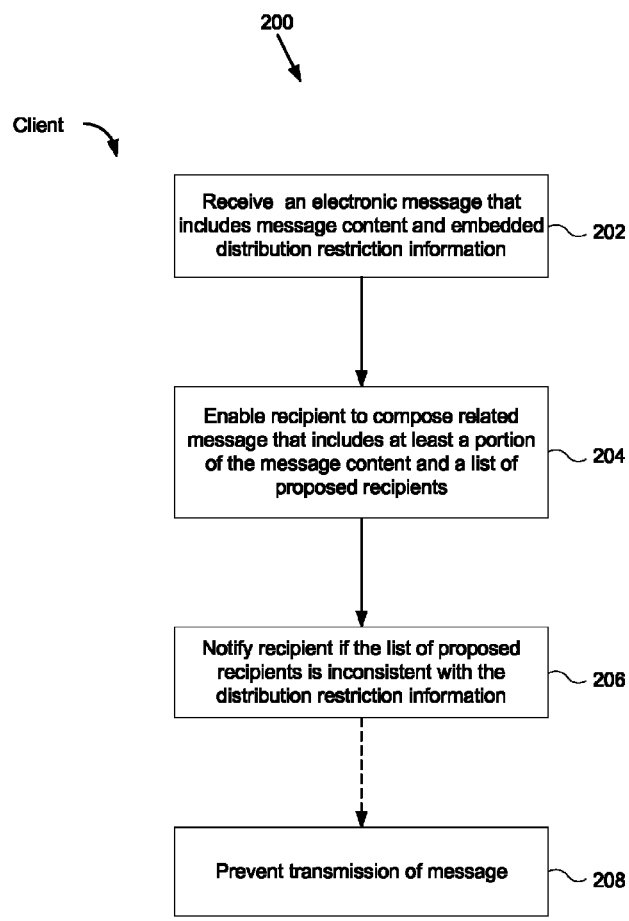
FIG. 2A is a flow diagram of a process for restricting distribution of electronic messages according to some embodiments of the present invention.

FIG. 2A is a flow diagram of a process 200 for restricting distribution of electronic messages according to some embodiments of the present invention. According to this embodiment, the process 200 occurs solely at the client device. The process begins when a user of a client device 102 receives an electronic message that includes message content and embedded distribution restriction information 202. The user may also be known as the recipient of the electronic message.

The distribution restriction information identifies a group of recipients to whom the content of the received electronic message can be sent. For example, the distribution restriction information may identify a distribution group consisting of all email addresses having a predefined domain name. In another example, the distribution restriction information may identify a distribution group consisting of a predefined list of email addresses. In yet another example, the distribution restriction information may identify a distribution group that consists of, or includes all email addresses having a respective domain name and a respective list of email addresses. In a further example, the distribution restriction information in a received message corresponds to the participants (the sender and recipients) of the received message, in which case only the original participants of the message are allowed to receive reply messages, sent in reply to the received message. In some embodiments, subsequent messages in the same email conversation or thread are also subject to the same distribution restrictions as the first reply or forwarding message in the conversation or thread.

The client device 102 enables the user to compose a related message that includes at least a portion of the message content and a list of proposed recipients 204. For example, the related message can be a reply to the received message or an attempted forwarding of the received message to another proposed recipient. The client device then notifies the recipient if the list of proposed recipients is inconsistent with the distribution restriction information 206. In some embodiments, the client also prevents transmission of the message 208.

Figure 2B:
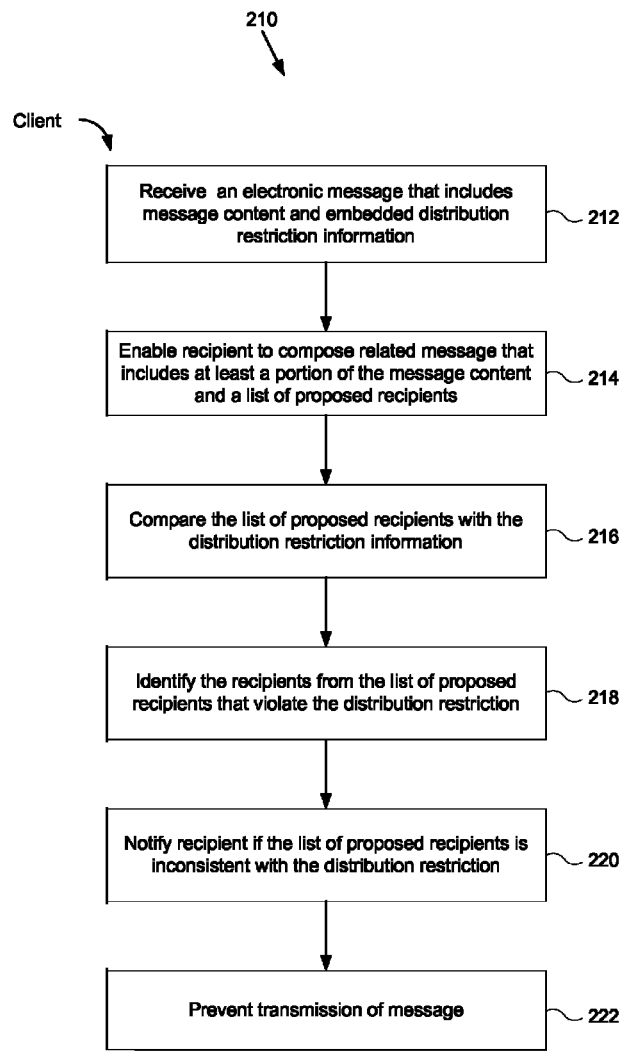
FIG. 2B is a flow diagram of a process for restricting distribution of electronic messages according to other embodiments of the present invention.

FIG. 2B is a flow diagram of a process 210 for restricting distribution of electronic messages according to other embodiments of the present invention. Similar to the process 200 above, this process 210 occurs at the client device and begins when a user (the message recipient) of a client device 102 receives an electronic message that includes message content and embedded distribution restriction information 212. The client device then enables the user to compose a related message that includes at least a portion of the message content and a list of proposed recipients 214. The client device 102 then compares the list of proposed recipients with the distribution restriction information 216 and identifies the proposed recipients (if any) from the list of proposed recipients that violate the distribution restriction 218. Thereafter, the client device 102 notifies the recipient if the list of proposed recipients is inconsistent with the distribution restriction 220. If there is an inconsistency, the client prevents transmission of the message 222.

FIG. 3A is a flow diagram of a process 300A for restricting distribution of electronic messages according to some embodiments of the present invention. The process 300A begins at a client device 102 when an electronic message that includes message content and embedded distribution restriction information is received 302. The client enables the recipient to compose a related message that includes at least a portion of the message content and a list of proposed recipients 304. The distribution restriction information is embedded in the composed related message 306. Then client 102 then sends at least the list of proposed recipients to a server 308. In some embodiments, the server may already be in possession of the distribution restriction information, from the earlier message. In some embodiments, the composed message is sent along with the list of proposed recipients and the embedded distribution restriction information. The server then receives the list of proposed recipients and embedded distribution restriction information 310. After receiving the list and embedded information, the server compares the list of proposed recipients with the distribution restriction information 312. An inquiry is performed to determine whether the list is consistent with the distribution restriction information 314. If the list is consistent with the distribution restriction information (314-Yes), the server sends a "recipient list OK" message to the client 320, which is then received by the client 324. In some embodiments, the server may send any other type of similar message notifying the client that the list of proposed recipients does not violate the distribution restriction. If the list is not consistent with the distribution restriction information (314—No), the server sends an error message 318, which is received by the client 322. In some embodiments, the server not only notifies the client of the violation, but may also identify which recipients on the list violate the distribution information 316.

Figure 3B:
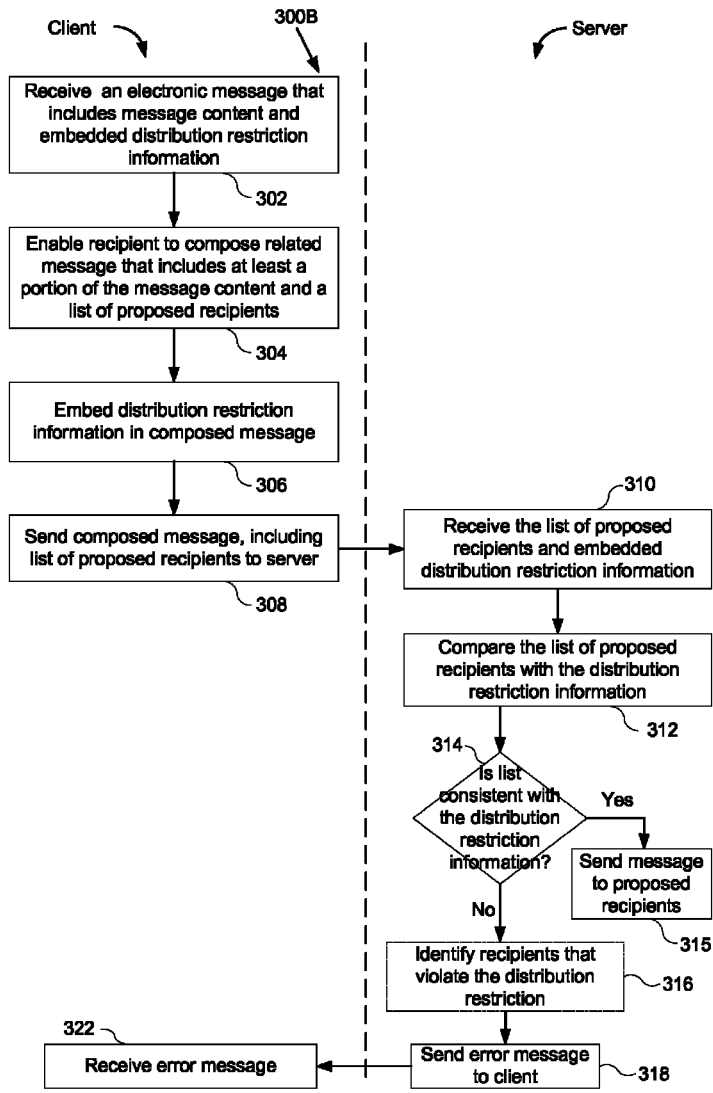
FIG. 3B is a flow diagram of a process for restricting distribution of electronic messages according to other embodiments of the present invention.

FIG. 3B is a flow diagram of a process 300B for restricting distribution of electronic messages according to other embodiments of the present invention. The process 300B is similar to the process 300A described above. However, in the process 300B, after the server performs an inquiry to determine whether the list is consistent with the distribution restriction information 314, and if the list is consistent with the distribution restriction information (314-Yes), the server then goes ahead and sends the message to the proposed recipients 315. The server may optionally notify the client of the successful transmission of the message. Similar to the process described above, if the list is not consistent with the distribution restriction information (314—No), the server sends an error message to the client 318 and the client receives the error message 322. In some embodiments, the server not only notifies the client of the violation, but may also identify which recipients on the list violate the distribution information 316.

In some alternate embodiments, the composed message is sent to those recipients on the list of proposed recipients who are consistent with the distribution restriction information for the message, and the client is notified of the proposed recipients to whom the message was not sent because of the distribution restriction information. Furthermore, in some alternate embodiments, a third party (e.g., a system administrator) is informed when a user or client attempts to send a message to proposed recipients (or addresses) that violate the distribution restriction information for a message. For example, the third party may be sent information identifying the client or user, the distribution restriction information and the proposed recipients or addresses that violate the distribution restriction information for the message. In some embodiments, the sending of such information to a third party is optional and is controlled by a parameter that may be included in the distribution restriction information (e.g., the information is sent to a third party only if a predefined parameter is present in the distribution restriction information).

FIG. 4A illustrates a schematic screenshot 400 of a user interface for composing an electronic message. The schematic screenshot 400 shows an exemplary distribution restriction warning according to some embodiments of the present invention. The electronic message comprises a recipient field 402 (which may alternately be called an addressee field) for entering a list of proposed recipients (or addressees) and a message composition window 404 for composing the electronic message. As illustrated in this figure, a user composes a reply message to a message sender and enters a list of proposed recipients in the recipient field 402. The reply message contains embedded distribution restriction information. After the message is composed, the user attempts to send the message by selecting the "send" button 406. In some embodiments, as explained in FIGS. 2A and 2B, the client compares the list of proposed recipients to the distribution restriction information. If the list does not match the distribution restriction, an error message 408 appears stating that the message cannot be sent. The error message 408 may be displayed in an iFrame (inline Frame), a pop-up window, a sub-window of the message composition window, or in any other appropriate field, window or region of the user interface. In other embodiments, as explained in FIGS. 3A and 3B, a server may perform the comparison and send the notification.

In some embodiments, when the user attempts to save a draft of the composed message by selecting the "save" button 410, an error message 408 appears if list of proposed recipients does not match the distribution restriction. In some embodiments, the distribution information may be included in the header of the electronic message. In yet other embodiments, the distribution information may be marked by predefined phrases or may include special syntax within the message itself.

Figure 4B:
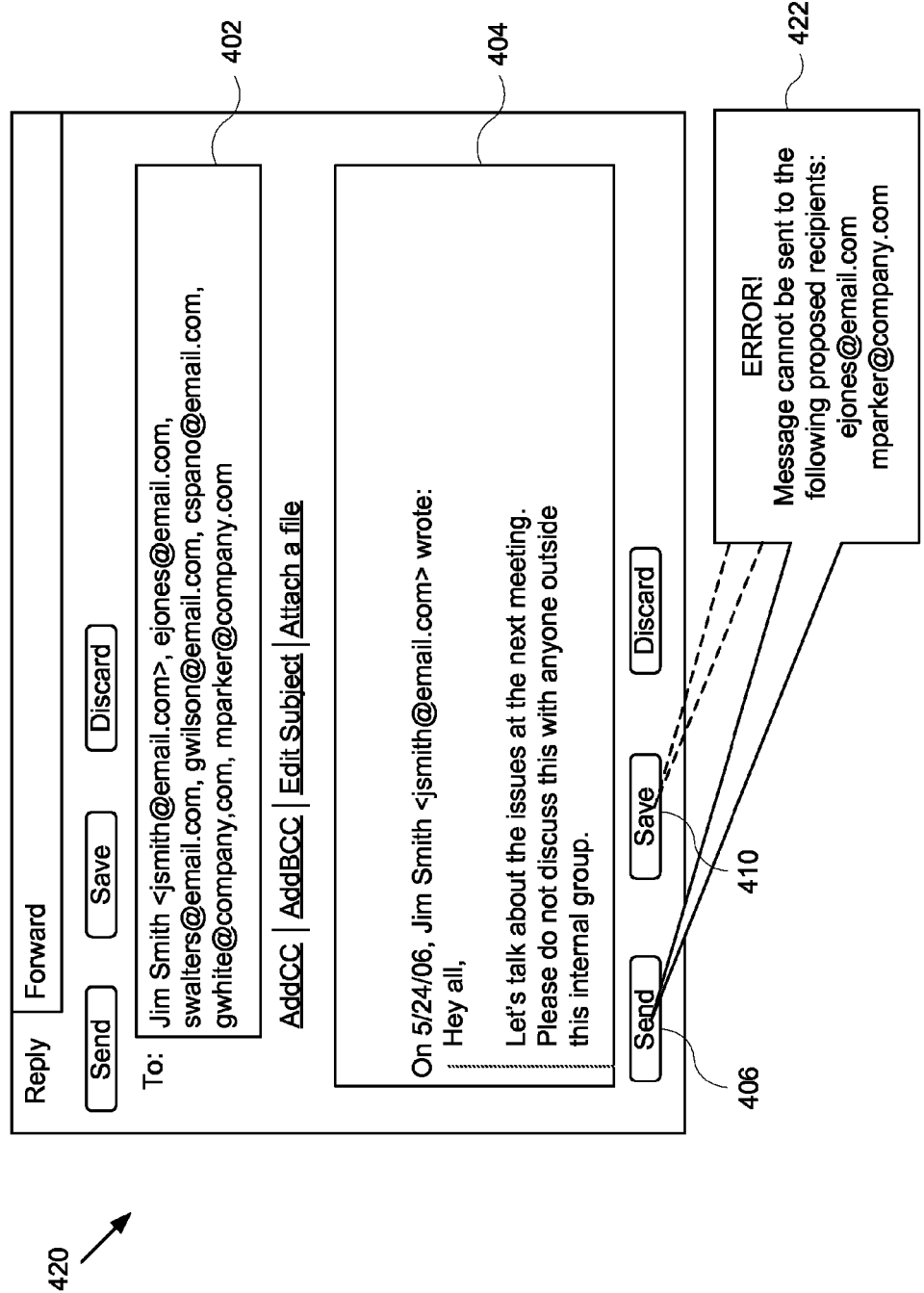
FIG. 4B illustrates a schematic screenshot of an electronic message with a distribution restriction warning according to other embodiments of the present invention.

FIG. 4B illustrates a schematic screenshot 420 of a user interface for composing an electronic message. The schematic screenshot 420 includes a distribution restriction warning according to other embodiments of the present invention. Similar to the previous figure, the user is composing a reply message to a message sender and has entered a list of proposed recipients in the recipient field 402. When the user attempts to send the message by selecting the "send" button 406, an error message 422 appears. According to this embodiment, the error message not only notifies the user that the message cannot be sent, but also identifies which proposed recipients, of the list of proposed recipients, violates the embedded distribution restriction.

Figure 4C:
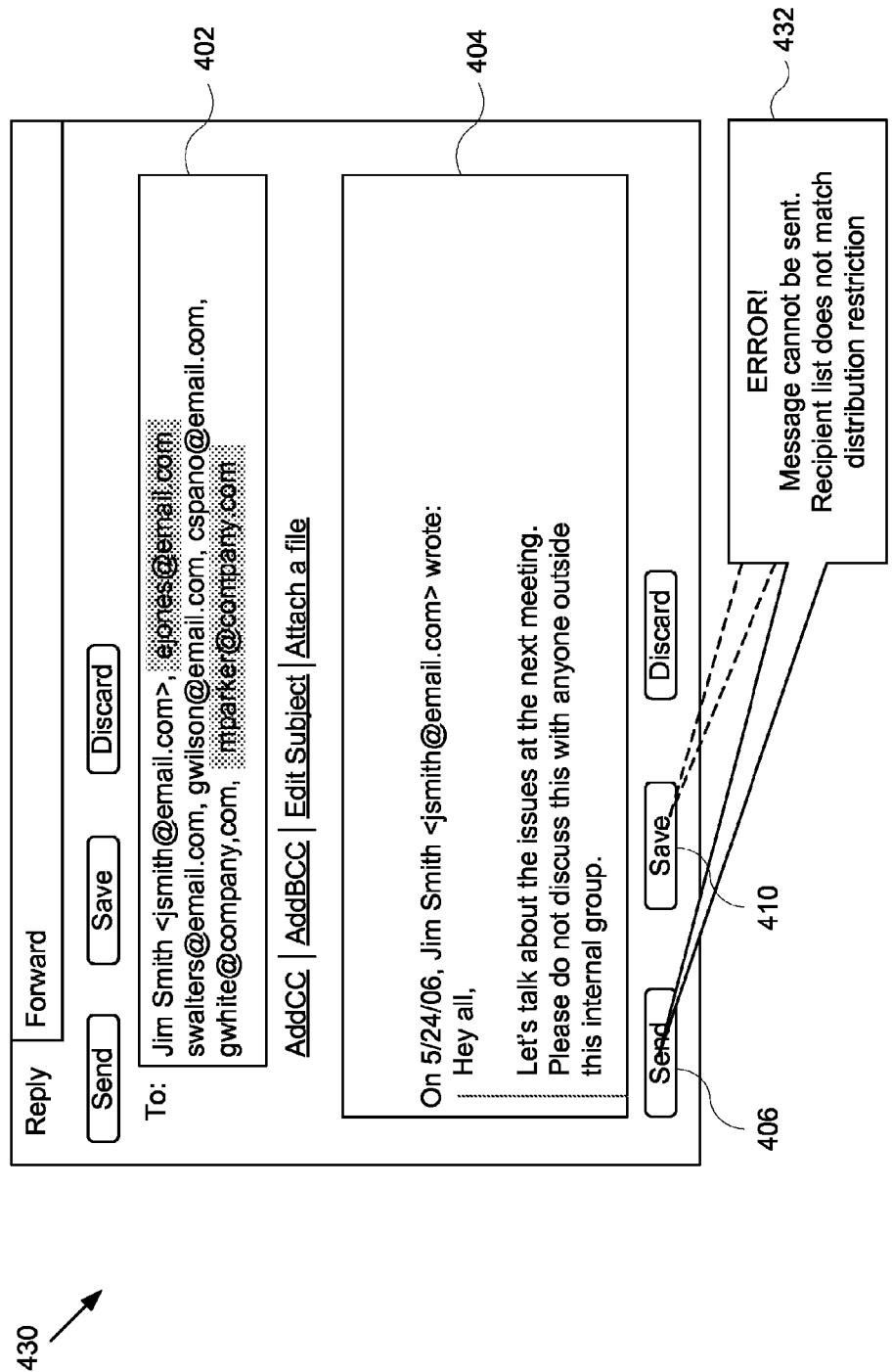
FIG. 4C illustrates a schematic screenshot of an electronic message with a distribution restriction warning according to other embodiments of the present invention.

FIG. 4C illustrates a schematic screenshot 430 of an electronic message with a distribution restriction warning according to other embodiments of the present invention. Similar to the two previous figures, the user is composing a reply message to a message sender and has entered a list of proposed recipients in the recipient field 402. When the user attempts to send the message by selecting the "send" button 406, and the list of proposed recipients contain a recipient that violates the distribution restriction, an error message 432 appears and the names that violate the distribution restriction are highlighted. The term "highlight" is used here to mean displaying in a visually distinctive manner, such as bolding, underlining, changing background color, changing font color, changing the font, etc. Furthermore, in this context, the term "highlight" means generating formatting information for displaying something (e.g., a specified portion of text) in a distinctive manner. For example, as mentioned above and as seen in FIG. 4C, a recipient that violated the distribution restriction is formatted to be displayed with a changed background color.

In some embodiments, the distribution restriction information is message-specific and is not actually embedded in the electronic message, but simply associated with a specific message. In some embodiments, the message-specific distribution restriction information for a respective message is associated with the respective message and stored in a server. For example, the message-specific distribution restriction information for a respective message may be stored in a server along with a message identifier or a conversation identifier for the message(s) to which it applies.

Figure 5A:
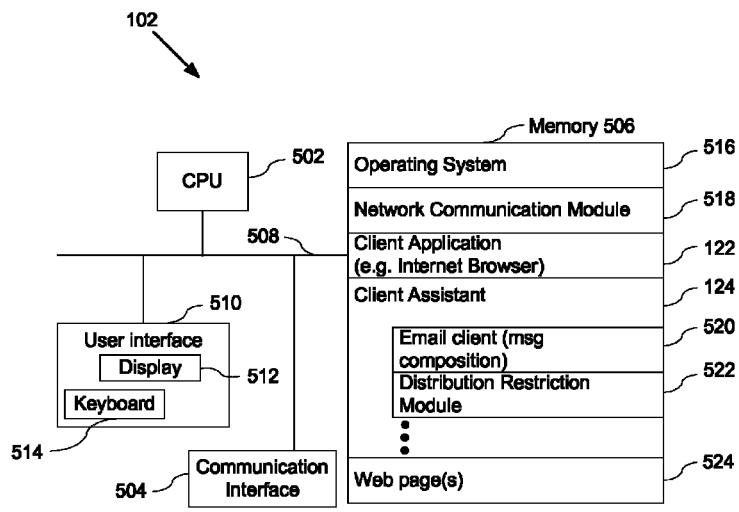
FIG. 5A is a block diagram of an exemplary client computer or device in accordance with some embodiments of the present invention.

FIG. 5A is a block diagram of an exemplary client computer or device 102 in accordance with some embodiments of the present invention. The client 102 typically includes one or more processing units (CPUs) 502, one or more network or other communications interfaces 504, memory 506, and one or more communication buses 508 for interconnecting these components. The communication buses 508 may include circuitry (sometimes called a chipset) that interconnects and controls communications between system components. The client 102 optionally may include a user interface 510 comprising a display device 512 and a keyboard 514. Memory 506 includes high-speed random access memory, such as DRAM, SRAM, DDR RAM or other random access solid state memory devices; and may include non-volatile memory, such as one or more magnetic disk storage devices, optical storage devices, flash memory devices, or other non-volatile solid state storage devices. Memory 506 may optionally include one or more storage devices remotely located from the CPU (s) 502. Memory 506, or alternatively one or more storage devices (e.g., one or more nonvolatile storage devices) within memory 506, includes a computer readable non-transitory storage medium. In some embodiments, memory 506 or the computer readable storage medium of memory 506 stores the following programs, modules and data structures, or a subset thereof:

- an operating system 516 that includes procedures for handling various basic system services and for performing hardware dependent tasks;
- a network communication module 518 that is used for connecting the client 102 to other computers via the one or more communication networks, such as the Internet, other wide area networks, local area networks, metropolitan area networks, and so on;
- a client application 122 that can permit a user to interact with the client 102 as described above;
- a client assistant 124; and
- one or more web pages 525 that may be displayed on client application 122.

The client assistant 124 includes an email client 520 for message composition and a distribution restriction module 522. The distribution restriction module 522 enables a user to place restrictions or limitations on the distribution of certain electronic messages. The one or more web pages 525 may enable a user to access webmail or web-based email applications for sending and receiving electronic messages.

Figure 5B:
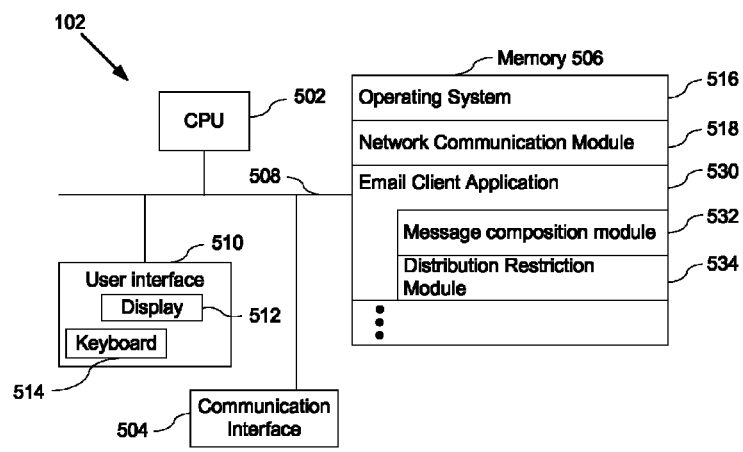
FIG. 5B is a block diagram of an exemplary client computer or device in accordance with other embodiments of the present invention.

FIG. 5B is a block diagram of an exemplary client computer or device 102 in accordance with other embodiments of the present invention. This client device also includes one or more processing units (CPUs) 502, one or more network or other communications interfaces 504, memory 506, and one or more communication buses 508 for interconnecting these components. In some embodiments, memory 506 stores the following programs, modules and data structures, or a subset thereof:

- an operating system 516 that includes procedures for handling various basic system services and for performing hardware dependent tasks;
- a network communication module 518 that is used for connecting the client 102 to other computers via the one or more communication networks, such as the Internet, other wide area networks, local area networks, metropolitan area networks, and so on; and
- one or more email client applications 530.

The one or more email client applications 530 may include a message composition module 532 and a distribution restriction module 534. The message composition tool 532 enables a user to compose electronic messages using the email client application 530. The distribution restriction module 534 enables a user to place restrictions or limitations on the distribution of certain electronic messages.

Figure 6:
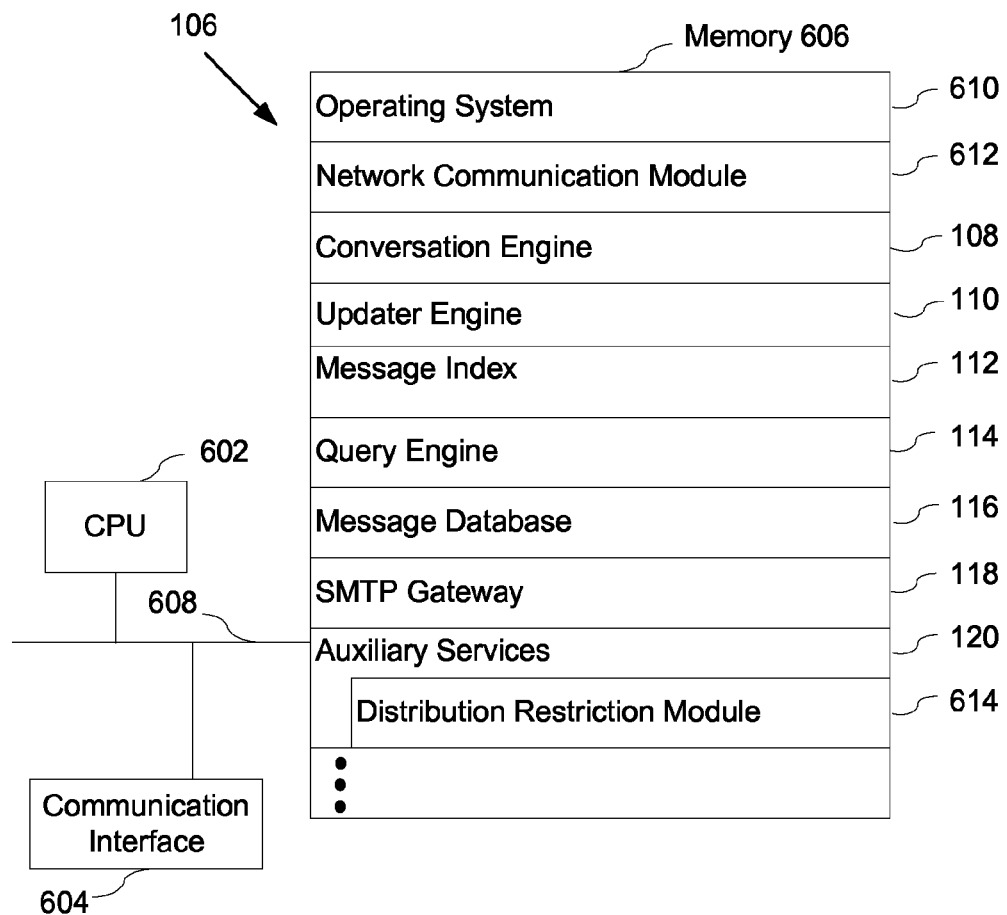
FIG. 6 is a block diagram of an exemplary server in accordance with some embodiments of the present invention.

FIG. 6 is a block diagram of an exemplary information service 106 in accordance with other embodiments of the present invention. The information service 106 typically includes one or more processing units (CPUs) 602, one or more network or other communication interfaces 604, memory 606, and one or more communication buses 608 for interconnecting these components. The communication buses 608 may include circuitry (sometimes called a chipset) that interconnects and controls communications between system components. The information service 106 optionally may include a user interface (not shown). Memory 606 includes high-speed random access memory, such as DRAM, SRAM, DDR RAM or other random access solid state storage devices; and may include non-volatile memory, such as one or more magnetic disk storage devices, optical disk storage devices, flash memory devices, or other non-volatile solid state storage devices. Memory 606 may optionally include one or more storage devices remotely located from the CPU (s) 602. In some embodiments, memory 606 stores the following programs, modules, and data structures, or a subset thereof:

- an operating system 510 that includes procedures for handling various basic system services and for performing hardware dependent tasks;
- a network communication module 512 that is used for connecting the information service 106 to other computers via the one or more communication network interfaces 608 and one or more communication networks, such as the Internet, other wide are networks, local area networks, metropolitan area networks, and so on;
- a conversation engine 108;
- an updater engine 110;
- a message index 112;
- a query engine 114;
- a message database 116;
- an SMTP gateway 118; and
- auxiliary services 120.

The auxiliary services 120 may include a distribution restriction module 614. The distribution restriction module 614 enables a user to place distribution restrictions on electronic messages and any related messages created thereafter. The distribution restrictions may be embedded in the electronic messages, included in the header of the electronic message, may be marked by predefined phrases, or may include special syntax within the message itself. Each of the above identified elements in FIGS. 5A, 5B and 6 may be stored in one or more of the previously mentioned memory devices, and corresponds to a set of instructions for performing a function described above. The above identified modules or programs (i.e. set of instructions) need not be implemented as separate software programs, procedures or modules, and this various subsets of these modules may be combined or otherwise rearranged in various embodiments. In some embodiments, memory 506 or 606 may store a subset of the modules and data structures identified above. Furthermore, memory 506 and 606 may store additional modules and data structures not described above.

Although FIGS. 5A, 5B and 6 show respectively a client 102 and information server 106, the figures are intended more as functional descriptions of the various features which may be present in a client and set of servers than as a structural schematic of the embodiments described therein. In practice, and as recognized by those of ordinary skill in the art, items shown separately could be combined and some items could be separated. For example, some items shown separately in FIG. 6 could be implemented on single servers and single items could be implemented by one or more servers. The actual number of servers used to implement and information service 106 and how features are allocated among them will vary from one implementation to another, and may depend in part on the amount of data traffic that the system must handle during peak usage periods as well as during average usage periods.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method of restricting distribution of electronic messages, comprising:
   at a client system having one or more processors and memory storing one or more programs for execution by the one or more processors:
   receiving an electronic message, the message including message content and message-specific distribution restriction information;
   enabling a recipient of the electronic message to compose a related message that includes at least a portion of the message content, the composed message including a list of proposed recipients; and
   in connection with an operation to save a draft of the composed message without initiating transmission of the related message to the list of proposed recipients:
      initiating comparison of the list of proposed recipients with the distribution restriction information associated with the received electronic message;
      identifying recipients from the list of proposed recipients that violate the distribution restriction; and
      notifying the recipient if the list of proposed recipients is inconsistent with the distribution restriction information associated with the received electronic message, notifying including visually highlighting in the list of proposed recipients the identified recipients who violate the distribution restriction.

2. The method of claim 1, including comparing, at the client system, the list of proposed recipients with the distribution restriction information embedded in the received electronic message.

3. The method of claim 1, including sending a request to a remotely located computer to compare the list of proposed recipients with the distribution restriction information embedded in the received electronic message.

4. The method of claim 1, including:
receiving a transmit message operation; and
preventing transmission of the composed message to the list of proposed recipients when the list of proposed recipients is inconsistent with the distribution restriction information embedded in the received electronic message.

5. The method of claim 1, wherein the list of proposed recipients is inconsistent with the distribution restriction information embedded in the received electronic message when at least one proposed recipient is not a member of a group defined by the embedded distribution restriction requirement.

6. The method of claim 1, wherein distribution restriction information corresponds to a distribution group selected from the set consisting of all email addresses having a predefined domain name, a predefined list of email addresses, and a group that includes all email addresses having a respective domain name and a respective list of email addresses.

7. The method of claim 1, wherein the distribution restriction information corresponds to participants of the received electronic message.

8. The method of claim 1, wherein the initiating and the notifying are additionally performed when the recipient attempts to send the composed message.

9. The method of claim 1, wherein the initiating and the notifying are additionally performed when the recipient attempts to add a proposed recipient to the list of proposed recipients.

10. The method of claim 1, further including embedding the distribution restriction information in the composed message.

11. The method of claim 1, wherein the notifying includes presenting a list of the identified recipients that violate the distribution restriction.

12. The method of claim 1, wherein the operation to save the draft of the composed message is user initiated.

13. A method of restricting distribution of electronic messages, comprising:
at a client system having one or more processors and memory storing one or more programs for execution by the one or more processors:
receiving an electronic message, the message including message content and embedded distribution restriction information;
enabling a recipient of the electronic message to compose a related message that includes at least a portion of the message content, the composed message including a list of proposed recipients;
embedding the distribution restriction information in the composed message; and
in connection with an operation to save a draft of the composed message without initiating transmission of the related message to the list of proposed recipients:
sending at least the list of proposed recipients to a remotely located server to compare the list of proposed recipients with the distribution restriction information associated with the received electronic message and identify recipients from the list of proposed recipients that violate the distribution restriction; and
receiving an error message from the server if the list of proposed recipients in the composed message is inconsistent with the distribution restriction information embedded in the received electronic message, wherein the error message includes information for visually highlighting in the list of proposed recipients the identified recipients who violate the distribution restriction.

14. The method of claim 13, wherein the receiving includes receiving a list of recipients who violate the distribution restriction.

15. The method of claim 13, wherein the sending includes sending the composed message to the server, and wherein the distribution restriction information is embedded in the composed message.

16. A method of restricting distribution of electronic messages, comprising:
at a system, remotely located from a client, having one or more processors and memory storing one or more programs for execution by the one of more processors:
in connection with an operation to save a draft of an electronic message composed at the client and without initiating transmission of the electronic message to a list of proposed recipients:
receiving from the client the list of proposed recipients of the electronic message, distribution restriction information associated with the electronic message, and a request to compare the list of proposed recipients with the distribution restriction information associated with the received electronic message;
comparing the list of proposed recipients with the distribution restriction information associated with the electronic message;
identifying recipients from the list of proposed recipients that violate the distribution restriction; and
sending an error message to the client if the list of proposed recipients in the electronic message is inconsistent with the distribution restriction information associated with the received electronic message, wherein the error message includes information for visually highlighting in the list of proposed recipients the identified recipients who violate the distribution restriction.

17. The method of claim 16, further including identifying recipients, if any, in the list of proposed recipients who violate the distribution restriction.

18. The method of claim 17, wherein the error message includes the identified restricted recipients.

19. The method of claim 16, further including receiving the message content of the electronic message, and wherein the distribution restriction information is embedded in the electronic message.

20. The method of claim 16, further including receiving the message content of the electronic message, and sending the electronic message to recipients in the list of proposed recipients that do not violate the distribution restriction.

21. A client system for restricting distribution of electronic messages, comprising:
memory;
one or more processors; and
one or more modules stored in memory and configured for execution by the one or more processors, the modules comprising:
instructions for receiving an electronic message, the message including message content and embedded distribution restriction information;
instructions for enabling a recipient of the electronic message to compose a related message that includes at least a portion of the message content, the composed message including a list of proposed recipients; and instructions for processing the composed message in connection with an operation to save a draft of the composed message without initiating transmission of the composed message to the list of proposed recipients, the processing instructions including:

instructions for initiating comparison of the list of proposed recipients with the distribution restriction information associated with the received electronic message;

instructions for identifying recipients from the list of proposed recipients that violate the distribution restriction; and instructions for notifying the recipient if the list of proposed recipients is inconsistent with the distribution restriction information embedded in the received electronic message, notifying including visually highlighting in the list of proposed recipients the identified recipients who violate the distribution restriction.

22. A non-transitory computer readable storage medium storing one or more programs for execution by one or more processors in a client computer system, the one or more programs comprising:

instructions for receiving an electronic message, the message including message content and embedded distribution restriction information;

instructions for enabling a recipient of the electronic message to compose a related message that includes at least a portion of the message content, the composed message including a list of proposed recipients; and instructions for processing the composed message in connection with an operation to save a draft of the composed message without initiating transmission of the composed message to the list of proposed recipients, the processing instructions including:

instructions for initiating comparison of the list of proposed recipients with the distribution restriction information associated with the received electronic message;

instructions for identifying recipients from the list of proposed recipients that violate the distribution restriction; and instructions for notifying the recipient if the list of proposed recipients is inconsistent with the distribution restriction information embedded in the received electronic message, notifying including visually highlighting in the list of proposed recipients the identified recipients who violate the distribution restriction.

23. A system for restricting distribution of electronic messages, comprising:

memory;

one or more processors; and one or more modules stored in memory and configured for execution by the one or more processors, the modules comprising instructions for processing an electronic message in connection with an operation to save a draft of the electronic message without initiating transmission of the electronic message to a list of proposed recipients, the instructions including:

instructions for receiving from a client remotely located from the system the list of proposed recipients of the electronic message, distribution restriction information associated with the electronic message, and a request to compare the list of proposed recipients with the distribution restriction information associated with the received electronic message;

instructions for comparing the list of proposed recipients with the distribution restriction information associated with the electronic message;

instructions for identifying recipients from the list of proposed recipients that violate the distribution restriction; and instructions for sending an error message to the client if the list of proposed recipients in the electronic message is inconsistent with the distribution restriction information associated with the received electronic message, wherein the error message includes information for visually highlighting in the list of proposed recipients the identified recipients who violate the distribution restriction.

24. A non-transitory computer readable storage medium storing one or more programs for execution by one or more processors in a computer system, the one or more programs comprising:

instructions for processing an electronic message in connection with an operation to save a draft of the electronic message without initiating transmission of the electronic message to a list of proposed recipients, the instructions including:

instructions for receiving, from a client remotely located from the computer system, the list of proposed recipients of the electronic message, distribution restriction information associated with the electronic message, and a request to compare the list of proposed recipients with the distribution restriction information associated with the received electronic message;

instructions for comparing the list of proposed recipients with the distribution restriction information associated with the electronic message;

instructions for identifying recipients from the list of proposed recipients that violate the distribution restriction; and instructions for sending an error message to the client if the list of proposed recipients in the electronic message is inconsistent with the distribution restriction information associated with the received electronic message, wherein the error message includes information for visually highlighting in the list of proposed recipients the identified recipients who violate the distribution restriction.

* * * * *